UNITED STATES PATENT OFFICE.

WILLIAM E. RICE, OF WORCESTER, MASSACHUSETTS.

COATING FOR WIRE PREPARATORY TO DRAWING.

SPECIFICATION forming part of Letters Patent No. 291,938, dated January 15, 1884.

Application filed June 1, 1883. (No specimens.)

*To all whom it may concern:*

Be it known that I, WILLIAM E. RICE, a citizen of the United States, residing at Worcester, in the county of Worcester and State of Massachusetts, have invented certain new and useful Improvements in Coating Material or Baths for Preparing Wire for Drawing; and I declare the following to be a description of my said invention sufficiently full, clear, and exact to enable others skilled in the art to which it appertains to make and use the same.

The object of my present invention is to provide an improved bath, solution, or material for preparing and coating the surface of wire preliminary to its being drawn through the reducing-dies, which material or bath will, when used, form a thin, tenacious, and uniform coating or film upon the wire-surface that will protect and lubricate the dies, to prevent abrasion or scratching of the contact-surfaces, in a very efficient and satisfactory manner, and which material can also be conveniently and economically prepared and used. These objects I attain by the use of glucose as an ingredient of the coating bath or solution; and my invention consists, first, in the employment of glucose as a material for coating or preparing wire, or as an ingredient of the coating bath or solution; second, in the employment of glucose, in combination with lime, in a solution or bath for coating or preparing wire for drawing; third, in the employment of glucose, in combination with a body substance of a finely pulverulent non-gritty nature, (as, for instance, pulverized talc, fatty clays, ground farinaceous substances, and similar materials,) in a composition, solution, or bath for coating or preparing wire in the process of manufacture.

For the preparation of the coating material in accordance with my invention, the specified ingredients may be used in about the proportions named with good practical results, although I do not desire to confine my invention to the exact formula specified, as a considerable degree of variation may be allowed in the proportions, accordingly as a thick or thin coating is required, or as may be desirable for different kinds of wire and for the various body substances used. The proportions which I consider adapted for ordinary iron and steel wire are, of glucose, two hundred pounds; of pulverized lime, two hundred pounds; of water, two hundred gallons, more or less. The glucose is preferably diluted with a portion of the water, and the lime separately dissolved in another portion of water, and the two afterward mixed together in the bath.

The solution is preferably used hot, or heated to about 200° Fahrenheit, more or less. The wire, in coils on reels, is dipped or immersed in the bath in the ordinary manner, remaining in the solution a sufficient time to become heated to about the same temperature as the bath; or the wire may be heated before immersion. Upon removal from the bath, the coating material soon solidifies upon the surface of the wire, and forms a thin, hard, and tenacious film or enamel of uniform thickness, that adheres to and protects the surface in a very superior manner. When coated, the wire may be placed in a suitable dry-room, to prevent any tendency to absorption of moisture, which might otherwise occur while awaiting its time for drawing. From the dry-room it is taken to the drawing-blocks and passed through the dies in the ordinary manner.

When desired, other substances may be used in the bath solution, in addition to or as a substitute equivalent for the lime, in connection with the glucose, and I contemplate using talc, steatite, or farinaceous substances in this connection for certain cases; but for the ordinary wire-drawing I now consider the formula specified as preferable.

Glucose may be employed in other mixtures than that above specified for coating wire, if desired; and such employment of the material for the purpose specified is included as within the scope of my invention.

The advantages of a coating composed of or containing glucose are that it firmly adheres to the wire, withstands the drawing action in a superior manner, and holds the lime or body substance firmly to the surface which it protects and lubricates, and gives a good, uniform surface and finish.

What I claim, and desire to secure by Letters Patent, is—

A bath or coating for wire preparatory to drawing, composed of glucose in combination with a fine body substance—as lime—in solution with water, substantially as hereinbefore set forth.

Witness my hand this 30th day of May, A. D. 1883.

WILLIAM E. RICE.

Witnesses:
CHAS. H. BURLEIGH,
O. C. WHITE.